United States Patent [19]

MacWilliams et al.

[11] 4,175,975

[45] Nov. 27, 1979

[54] AQUEOUS SUSPENSIONS

[75] Inventors: Dalton C. MacWilliams, Alamo, Calif.; James R. Wirt, Midland, Mich.

[73] Assignee: The Dow Chemical Company, Midland, Mich.

[21] Appl. No.: 881,481

[22] Filed: Feb. 27, 1978

Related U.S. Application Data

[63] Continuation of Ser. No. 644,675, Dec. 29, 1975, abandoned.

[51] Int. Cl.$^2$ .............................................. C04B 7/42
[52] U.S. Cl. ................................................... 106/100
[58] Field of Search .......................... 106/100; 241/16; 252/8.5 A, 8.5 C; 260/29.6 H

[56] References Cited

U.S. PATENT DOCUMENTS 2,905,565  9/1959  Dietz et al. ........................... 106/100

*Primary Examiner*—James Poer
*Attorney, Agent, or Firm*—G. D. Street

[57] ABSTRACT

Water-soluble salts of low-molecular weight polyacrylic acids function synergistically with inorganic salts to obtain superior reduction of water demand of dispersed inorganic solids. The disclosed invention is particularly adapted for use in the wet-grinding process for preparing portland cement.

38 Claims, No Drawings

AQUEOUS SUSPENSIONS

CROSS-REFERENCE TO RELATED APPLICATION

This is a continuation, of application Ser. No. 644,675 Filed Dec. 29, 1975 now abandoned.

BACKGROUND OF THE INVENTION

The present invention relates to the use of particular polyelectrolytes of low molecular weight and inorganic salt dispersant materials to achieve a reduction in the water demand of finely divided solids in water. It relates particularly to this use as an improvement in wet process production of portland cement.

It is known that polyelectrolytes such as polyacrylic acid salts, copolymers of acrylic acid and acrylamide, hydrolyzed polyacrylonitrile and the like which are flocculants at higher molecular weights show different properties and act as dispersants at lower molecular weights. Such polymers having molecular weights from a few thousand up to about 50,000, for example, have been recommended for use in various dispersant applications. See, for example, U.S. Pat. Nos. 3,534,911 and 3,604,634, relating to the grinding of calcium carbonate.

Combinations of polyacrylates and certain inorganic compounds have also been used in forming foundry sand compositions and in clay benefication and drilling fluids and muds. For example, polyacrylic acids and alkali metal salts, e.g., sodium carbonate, sodium silicate and the like are disclosed in U.S. Pat. No. 2,702,788 as resulting in increased drilling and viscosity and, hence, an increased yield of mud is obtained. Typically, the polyacrylates are used in amounts of about 0.1% or more and the sodium carbonate in amounts of from about 3%, or more. See also U.S. Pat. Nos. 3,583,911, 2,552,775 and 3,220,946, which generally disclose similar applications. The '911 patent teaches such use of polyacrylic acid and methylcellulose graft copolymers with from about 0.5 to about 7% by weight alkali metal salts while the '775 patent teaches the use of from about 0.2-5% by weight polyacrylates with from 1-12% alkali metal salts for similar applications and as agents for preventing water loss from the drilling fluid to the formation. The '946 patent discloses a synergistic action in clay benefication uses with mixtures of polyacrylates of M.W. 25,000 to about 150,000 and specific inorganic salts. Certain salts, e.g., sodium chloride, sodium carbonate, calcium carbonate, etc., are disclosed as being ineffective in said combination. U.S. Pat. No. 3,923,717 discloses the use of styrenemaleic anhydride to reduce water demand of wet process portland cement slurries. A two-part study by the Portland Cement Association, Chicago, Ill., entitled "Slurry Thinners". (Part I, Clausen et al., May 1953, Part II by Dersnah, March 1955) discloses the evaluation of various inorganic salt dispersants and mixtures thereof with other surface active agents in reducing the water content of cement slurries in wet process applications.

Of the above prior art references only the '717 patent and the Portland Cement Association Study relate to the wet grinding process for making portland cement, wherein limestone and clay and, optionally, a small amount of iron oxide are ground in the presence of water to obtain a slurry of very fine particles. Such slurry is then fed into a high temperature kiln where it is dried and calcined to form the clinker which is then ground to make portland cement. The water demand of the finely ground limestone-clay slurry is fairly high and usually requires a relatively large proportion of water, for example, about 30–50% by weight, usually from about 25 to about 35%, to obtain a fluid, pumpable slurry. This limits the rate at which the slurry can be processed and fed to the kiln and it also requires a large fuel input to dry and calcine a given quantity of solids to the clinker stage.

Many substances with dispersant activity are available and have been tried in order to decrease the water demand of suspended inorganic solids in various high solids water suspensions or slurries for various applications. Most of these, particularly in the wet process for making portland cement, have proven relatively ineffective or undesirable for one reason or another. Complex phosphates are undesirable because they tend to hydrolyze at the warm temperature developed during grinding and in storage of the slurry and because of the adverse effect of residual phosphate on the properties of the final portland cement product. Lignosulfonates, alone and in combination with inorganic salt dispersants, have been tried for this use, but these requires high addition levels for only marginal improvement. They also lose their activity rapidly during storage of the slurry. Many materials are also too expensive to be economically utilized in such operations.

We have now found, however, that the water demand of suspended inorganic solids necessary to make a pumpable slurry in the wet grinding process for making cement can be significantly reduced by use of water-demand reducing agent combination as described below.

SUMMARY OF THE INVENTION

We have discovered that mixtures of low molecular weight polacrylic acid salts and inorganic compounds, such as alkali metal salts of carbonates, bicarbonates, silicates, oxalates, aluminates and borates and ammonium salts of carbonates, bicarbonates, oxalates and borates which form insoluble salts with calcium, are unexpectedly effective for reducing the water demand of solids suspended in water while so maintaining desired pumpability levels of high solids-content aqueous suspensions, particularly those encountered in the wet process for making portland cement. The action of the polyacrylic acid salt in combination with selected inorganic compound (hereinafter collectively referred to from time to time as "water-demand reducing system or agents(s)") represents true synergism, said combinations effectively reducing the water demand of suspended solids at concentrations where neither additive alone is as effective.

These water-demand reducing agents are extremely effective for reducing water demand while maintaining desired viscosity for pumping purposes in various kinds of high solids suspensions in water of finely divided minerals, particularly in raw cement slurries consisting largely of limestone and clay, usually with a small amount of iron oxide. In this latter application especially, the above-described water-demand reducing system has a unique combination of efficiency, stability and compatability in the wet grinding process slurried together with a lack of any adverse effects in the calcining process. A reduction in water content can be achieved so that, with the same volume feed to the cement kiln, increases in production can be obtained with lower fuel costs. Increasing the feed rate to the kiln while operating at normal fuel input results in even further increases in clinker production. Retardation of set times are also obtained by use of the water-demand reducing system when recycle kiln dust (high in calcium oxide) is added to fresh cement kiln feed.

DETAILED DESCRIPTION OF THE INVENTION

The polyacrylic acid salt which can be employed in this invention can be any such polymer salt having an average polymer molecular weight in the range of from about 2000 to about 50,000 and preferably in the range of from about 2000 to about 20,000. An especially preferred molecular weight is in the range of from about 5000 to about 10,000. The preferred polymer molecules are further characterized in that about one-eighth to about one-half of them have terminal sulfonate groups. In another embodiment, polymers having a viscosity of from about 75 to about 150, preferably from about 75 to about 110, cps at 30% by weight solids and a molecular weight range from about 5000 to about 10,000 are preferred. The salt of the acid may be that of alkali metal or ammonium salts, such as sodium or potassium. However, the sodium and ammonium salts are preferred over other alkali metal salts.

Polymers of acrylic acid which are useful in this invention are readily apparent from the monomer by the action of heat, light, and/or catalysts. Catalysts which are particularly effective for this polymerization are the organic peroxides. The properties and nature of the polymer can be varied over a considerable range by the proper choice of catalysts and/or reaction conditions. The polymer can be further modified by the addition of small amounts of copolymerization agents, such as acrylamides, acrylonitrile, methyl acrylate, ethyl acrylate, 2-methyl propenoic acid and the like. These copolymers of acrylic acid containing up to about 10% by weight of the copolymerization agent are useful and operable in the application of this invention.

Certain preferred polyacrylates of the present invention are most advantageously prepared by polymerizing acrylic acid in aqueous solution at about 50°–170° C. in the presence of a redox polymerization catalyst system. The acrylic acid and a peroxy catalyst are separately and continuously dispersed into the aqueous medium at rates such that an effective and substantially constant concentration of the catalyst system is maintained in contact with the acrylic acid throughout the polymerization. A sulfite reducing agent, the preferred other component of the redox catalyst system, can be combined with the acrylic acid and the two added as a single aqueous solution, but preferably, the reducing agent is added separately and continuously as a third stream. Suitable sulfite reducing agents include sodium metabisulfite, sodium or bisulfite, sodium formaldehydesulfoxylate, sodium formaldehyde hydrosulfite.

Other reducing agents can be used to obtain polymers of essentially the same molecular weight and molecular weight distribution, but which differ in not having terminal sulfonate groups and which may be slightly less advantageous in some solids suspensions. A hypophosphite such as sodium or ammonium hypophosphite can be used as the reducing component of the redox catalyst system to obtain polymers having the same proportion of terminal phosphonate groups in place of the sulfonate groups derived from a sulfite. Other reducing agents provide the low molecular weight distribution effects although these do not supply the terminal sulfonate or phosphonate groups which are of added advantage, particularly in reducing foaming tendencies. These reducing agents include urea, potassium thiosulfate, and oxidizable salts such as ferrous sulfate.

The peroxy catalyst component can be any peroxide useful as a polymerization catalyst. Suitable peroxides, which preferably are water soluble, include hydrogen peroxide, tert-butyl hydroperoxide, and salts of per acids such as sodium persulfate, potassium percarbonate, ammonium peracetate, sodium perbenzoate, sodium perborate, diisopropyldipercarbonate and the like.

The concentration of peroxygen-containing catalyst can vary widely within limits of about 0.1–10% based on the entire polymerization mixture and referring to active catalyst present in the system at any one time during the process. Preferably, the amount of aqueous medium and the rates of addition of catalyst and acrylic acid are adjusted so that a relatively high peroxy catalyst concentration is maintained. Total peroxy catalyst used based on the acrylic acid is preferably about 0.5–5 mole percent. The reducing agent is employed in at least a molar equivalent amount based on the peroxy component and preferably is used in a quantity of about 20–100 percent excess. Both components of the redox catalyst system are preferably added as aqueous solutions of relatively high concentration.

The aqueous polymerization medium is preferably water but it may include up to about 30% by volume of a water-miscible organic solvent such as acetone, a lower alkanol, or dimethyl sulfoxide. Efficient stirring of the polymerization mixture or agitation by other effective means is required so that the streams of peroxy catalyst, reducing agent, and acrylic acid are quickly and thoroughly dispersed and intimately mixed in the polymerization medium. Superatmospheric pressure may be advantageous.

Other modes of polymerization may also be employed. These are well known in the art and the particular process of preparing the polymers is not critical to this invention.

The polymer product is used in the form of a water-soluble salt, usually the sodium salt. Other such salts will serve as well, for example, the potassium and ammonium salts. Surprisingly, these low molecular weight polyacrylate salts in combination with an inorganic salt are substantially more effective in maintaining fluidity of aqueous suspensions, particularly high solids mineral suspensions, than analogous polymers of similar molecular weight. Thus, corresponding polymers such as polyacrylamide, acrylamide-acrylic acid copolymers are inferior in this activity to the polyacrylates described herein even though these related polymers do have dispersant properties.

Examples of other suitable water-soluble anionic polymers include trademarked products such as, for example, Dispex N-40, which is manufactured by Allied Colloids Manufacturing Company Ltd., Daxad (available from the W. R. Grace Co.) and Tamol 850 (Rohm and Haas). Other suitable materials available in acid form would include Goodrich K732 (Goodrich Tire and Rubber Co.) and Uniroyal ND2 (available from Uniroyal Corp.).

The inorganic compound employed in the water-demand reducing system is a water-soluble salt of ammonium or an alkali metal radical which will form an insoluble salt with calcium and acts synergistically with the polyacrylic acid salt. The water-soluble inorganic salts which may be employed in the present invention are those which form insoluble salts with calcium and are selected from the group consisting of alkali metal salts of aluminates, borates, oxalates, carbonates, bicarbonates and silicates and ammonium salts of borates, oxalates, carbonates and bicarbonates. Alkali metal silicate salts, especially orthosilicates, are preferred as they exhibit the least tendency for the viscosity improvement to show some tendency to diminish upon standing for periods of 18 hours or more; such viscosity reversion tendency is a significant factor to consider where slurries are temporarily stored prior to processing. Especially preferred are the alkali metal carbonate, bicarbonate and silicate and ammonium carbonate and bicarbonate salts. Where more alkaline slurries are employed, or where kiln dust having a high calcium oxide content is recycled to the slurry, the metal silicate and waterglass silicate salt forms are preferred whereas the orthosilicate form is desirably employed in less alkaline slurries. Similar considerations apply where less basic ammonium salts are utilized.

The water-demand reducing agents of the present invention can be added to the cement slurry sequentially or as a premixed solution. When added sequentially, it is desirable that the inorganic salt be added first, followed by the polyacrylic acid salt. Preferably, the agents are added sequentially to the slurry, although the premix will be advantageous in certain situations.

In general any combinations of the polyacrylate and of the inorganic salt which act synergistically to reduce the water demand of high solids-contents aqueous suspensions are considered to be within the scope of the present invention. Generally, ratios of the polyacrylate salt to inorganic salt range from about 1:1 to as high as 1:80, although ratios of from 1:1 to about 1:10 are preferred. An especially preferred ratio range is from 1:1 to about 1:6. A ratio of 1:4 constitutes a preferred embodiment. The ratio employed will, as those skilled in the art will recognize, vary depending upon the concentration of the water-demand reducing system employed, the viscosity required for a particular operation, the grinding time, the type and composition of cement slurry being treated, and the like. Generally, in treating portland cement slurries, it has been found that concentrations of from about 0.005 to about 0.06 weight percent (based on slurry solids) of the polyacrylic acid salt used in combination with from about 0.05 to about 0.4 weight percent inorganic salt produce synergistic reduction of slurry water-demand. In a preferred embodiment concentrations of from about 0.01 to about 0.05 weight percent polyacrylic acid salt and from about 0.05 to about 0.2 weight percent inorganic salt are employed. In another embodiment, polyacrylic acid concentrations of from about 0.01 to about 0.05 weight percent and inorganic salt concentrations of from about 0.1 to about 0.2 weight percent are preferred.

Those skilled in the art will recognize that it is difficult to establish any one preferred concentrations range for the polyacrylates and inorganic salts as this will depend upon the viscosity required for a particular operation as well as the particular type of high solids suspension being treated. There are, for example, many different types of known and commercially available cement slurries of varying compositions which can be treated according to the present invention. The desired synergistic concentrations can readily be determined by those skilled in the art according to known procedures and by those illustrated in the examples set forth below.

In the wet process for making portland cement, the raw materials, including ingredients such as limestone, dolomite, oyster shells, blast furnace slag or other well known high calcium-containing products, are mixed with silicious materials, including slag, clay, shale or any other silica containing ingredient in amounts such that the calcium and silica materials constitute about 85% by weight of the clinker formed after heating in a kiln. The remaining ingredients include aluminum-containing and iron-containing ingredients. The mixture of raw ingredients, using well-known process steps, is ground with the addition of water to prepare an aqueous kiln feed slurry, which is then screened and pumped into storage tanks preparatory to further blending with other slurries or feeding into a clinkering kiln. Usually, the portion which passes a 200 mesh screen is used for preparing the clinker. Such slurries usually contain from 30–50% water by weight.

On an emperical basis, the cements made by grinding the resulting clinker will contain

| | |
|---|---|
| $SiO_2$ | 19–23% |
| $Al_2O_3$ | 4–8% |
| $Fe_2O_3$ | 1.5–6% |
| CaO | 62–67% |
| MgO | .6–5% |

Pumpable aqueous kiln feed slurry compositions containing from about 0.005 to about 0.06 weight percent (based on slurry solids) polyacrylate and from about 0.05 to about 0.4 weight percent inorganic salt constitute another preferred embodiment in the wet process for making portland cement. Preferably, such slurry compositions contain from about 0.01 to about 0.05 weight percent polyacrylic acid salt and from about 0.05 to about 0.2 weight percent inorganic salt.

The following examples are presented to illustrate the invention, but are not to be construed as limiting it in any manner whatsoever. The weight percent (wt. %) of water demand reducing agents, unless otherwise specified is based on the solids present in the slurry being treated.

EXAMPLE 1

The following illustrates the preparation of a polyacrylic acid which may be utilized in the present invention.

A reaction flask having multiple inlets and equipped with an efficient stirrer was charged with 1600 ml. of water and the water was heated to boiling. At this point, separate streams of 25% aqueous sodium persulfate and 25% aqueous sodium metabisulfite were started into the boiling water. After 1–2 minutes, a third stream of acrylic acid was started into the boiling and agitated solution. All three streams were continued at essentially constant rates under the above conditions so that in about 90 minutes there had been added 1250 g. of acrylic acid (17.3 g. moles), 400 g. of 25% aqueous metabisulfite solution (0.526 g. mole), and 300 g. of 9f 25% aqueous persulfate solution (0.315 g. mole. Rates were calculated so that addition of acrylic acid was completed 1–2 minutes before all of the persulfate and bisulfite had been added.

The reaction product was a clear, slightly viscous solution. To it was added about the theoretical quantity of 50% aqueous NaOH to convert the polyacrylic acid product to its sodium salt, having final pH about 10.

Vapor phase osmometric and membrane osmometric analysis of the product after dialysis to remove inorganic salts indicated respectively that the polymer (sodium form) was polyacrylic acid from about 5000 to about 10,000 molecular weight and a viscosity of from about 75 to about 110 cps at 30% solids. Elemental analysis indicated that about one fourth of the polymer molecules were terminated by a sulfonate group.

EXAMPLE 2

Various commercial samples of portland cement slurries were treated with polyacrylic acid salts and inorganic salt dispersants, both alone and in combination and the degree of reduction in water-demand of the dispersed solids was determined. In typical operations, a sample quantity of a ground, undried cement slurry is filtered to concentrate the same and raise the slurry solids content. About 100 ml. of such concentrated slurry is then stirred vigorously and the viscosity is determined with a Brookfield Helipath viscometer using an RTV head at 5 rpm and a T-B spindle. The slurry sample is diluted with a measured volume of filtrate, usually 0.5 ml to about 5.0 ml, mixed and the viscosity redetermined. This process is repeated until a viscosity of less than about 4000 cps is obtained. Approximately 10 grams of each slurry sample is weighed, evaporated to dryness at about 120° C. and reweighed. From the percent solids so obtained, a control logarithmic plot of viscosity versus percent solids is prepared and the percent solids at 4000 cps, (a viscosity value which is in the range preferred for pumpability in the wet process production of portland cement) is determined.

Inorganic salt test reagents are added to the cement slurry as received and the slurry concentrated as above and the viscosity versus solids plot determined. The polyacrylate test materials or polyacrylates in combination with the inorganic salt are added to the cement slurry after the same has been concentrated as filtration of the cement slurries containing these additives are well dispersed and are difficult or impossible to filter. Viscosity and solids determinations are similarly plotted.

Comparisons of the solids density determinations at 4000 cps for the untreated control slurries with slurries treated with each dispersant above and in combination can then be made to determine the degree of reduction in the water-demand of suspended solids.

In operations employing the above procedures, samples of portland cement slurry (obtained from the Oregon Portland Cement Co.) were treated with:
(1) 0.05% of the polyacrylate of Example 1 above;
(2) 0.2% of sodium carbonate (added before the slurry is concentrated);
(3) 0.2% sodium carbonate (added before the slurry is concentrated) and 0.05% of the polyacrylate of Example 1 above;
(4) a premixed combination of the same ingredients and amounts thereof used in (3).

The untreated cement slurry was found to have a solids density of about 63.25% at a viscosity of 4000 cps whereas the slurry treated with the polyacrylate alone (1) was determined to have slightly increased solids density of 65.8% at 4000 cps. The slurry (2) treated with sodium carbonate alone was determined to have a solids density of about 66.6 wt. %. However, the slurry treated with sodium carbonate followed by the polyacrylate (mixture 3) unexpectedly exhibited a dramatic increase in solids density to 78.8% at 4000 cps. The same agents added as a premix (mixture 4) also caused a great increase in solids density to 76.5% at 4000 cps.

By comparison with the untreated control sample and the samples (mixtures 1 and 2) treated with only one of the water-demand reducing agents, the synergistic effect of the sodium carbonate—sodium polyacrylate combination in reducing water demand of the suspended solids and increasing solids density at comparative viscosities is evident.

The slurry solids density for mixture (3) was increased (absolute values) by about 15 wt. % over the untreated control and from about 12–13 wt. % over the slight improvements seen with mixtures (1) and (2). Relative gains of about 24.5%, 19.7% and 18.3%, respectively over the control and mixtures 1 and 2 were thus obtained by mixture 3. The solids density for mixture (4) similarly increased about 13.2 wt. % (absolute) over the untreated slurry and about 10.7 and 9.9 wt. % over mixtures (1) and (2), respectively, thus amounting to relative gains of about 20%, 16.2% and 14.8%, respectively, over the untreated control and control samples 1 and 2.

EXAMPLE 3

In operations employing the procedures described in Example 2, samples of the same portland cement slurry were treated with sodium ortho silicate and sodium polyacrylate water-demand reducing agents. The untreated control slurry had a solids density of 64.1 wt. % at 4000 cps while a slurry sample treated with 0.2% sodium ortho silicate had a solids density of about 64 wt. % at 4000 cps (thus having no affect on the slurry). A slurry sample treated with 0.05 wt. % sodium polyacrylate had a solids density of about 65.8 wt. % at 4000 cps. The slurry sample treated with 0.2 wt. % sodium ortho silicate was concentrated and 0.05 wt. % sodium polyacrylate added thereto, with the resulting slurry having a solids density of about 76.3 wt. % at 4000 cps, or a total gain over the untreated control and silicate treated control of about 19% and a gain of about 16% over the polyacrylate-treated control. In an additional run, the silicate and polyacrylate were premixed and then added to the slurry. The resulting slurry had a solids density of about 75 wt. %.

EXAMPLE 4

Samples of the portland cement slurry in Example 2 were treated as in Example 2, the untreated control sample having a solids density of 65.2 wt. % at 4000 cps and control sample treated with 0.05% sodium polyacrylate having a solids density of 66.7% at 4000 cps. A control sample treated with 0.2 wt. % sodium oxalate was found to have solids density of about 68.0 to about 4000 cps. Concentration of the latter sample and addition of 0.05 wt. % sodium polyacrylate resulted in a slurry having a solids density of about 76 wt. % at 4000 cps. A slight reversion in the slurry viscosity was noted after a period of about 18 hours.

EXAMPLE 5

A portland cement slurry (obtained from the Calaveras Cement Co.) having about 80 parts limestone, about 8 parts silica, about 10 parts clay and about 2 parts iron oxide was treated according to the procedure set forth in Example 2. The untreated control slurry was found to have a solids density of about 65.2 wt. % at 4000 cps. Addition of 0.05 wt. % sodium polyacrylate raised the solids density at 4000 cps about 68.6 wt. % while addition of 0.2 wt. % Na₂CO₃ to another sample raised the solids density to about 70.4 wt. % at 4000 cps. Concentration of the latter sodium carbonate treated sample and addition thereto of 0.05 wt. % sodium polyacrylate gave a slurry having a solids density of about 80.3% at 4000 cps, an increase in solids density over the other control samples varying from 10 to about 15 wt. %, or total gains in density of from about 14 to about 23%.

EXAMPLE 7

Additional evaluations utilizing portland cement slurries from the Calaveras Cement Co. were carried out as in Example 2 and the results are set forth in the following Table I.

TABLE I

| | | % SOLIDS DENSITY AT 4000 CPS | | | | | |
|---|---|---|---|---|---|---|---|
| | | % Sodium Polyacrylate | | | | | |
| Control | | 0% | .005% | .01 | .02 | .04 | .08 |
| | % Na₂CO₃ | | | | | | |
| | 0 | 67.8 | 68.5 | 69.4 | 69.7 | 70.5 | 75.1 |
| 68.3 | 0.05 | 72.1 | 74.3 | 74.5 | 75.3 | 79.6 | 80.3 |
| 68.1 | 0.1 | 74.9 | 77.0 | 77.8 | 80.0 | 80.6 | 80.9 |
| 67.7 | 0.2 | 75.7 | 76.7 | 77.9 | 80.4 | 80.6 | 80.4 |
| | % Na₄SiO₄ | | | | | | |
| 67.3 | 0 | 67.3 | 68.5 | 68.7 | 69.6 | 71.3 | 76.9 |
| 67.9 | 0.1 | 71.7 | 77.5 | 78.5 | 79.8 | — | — |
| 66.0 | 0.2 | 70.1 | — | — | 78. | 79. | 79.6 |
| 67.7 | 0.4 | 73.8 | 75.1 | 76.2 | 77.2 | — | — |

The foregoing experiments demonstrate the synergistic action of polyacrylates with inorganic salts as herein designated in discussing the water-demand of high solids density cement slurries. The reduction in water content provides cement slurries which have a higher solids loading per given volume of slurry and which can readily be pumped to the clinker kiln. Thus, equal volume feed rates of cement slurries treated according to the present invention provide for an increase in clinker production without increasing fuel costs for the calcination operation. The synergistic combinations of the present invention possess additional economic advantages in that relatively expensive polyacrylates can be used at rates which do not render their use prohibitively expensive.

In commercial operations, the water-demand reducing system is usually added once the slurry or slurries are formed in the grinding operation. Preferably, the system is added to the slurry once it has left the grinder.

We claim:

1. In the wet process for the production of cement solids wherein limestone and clay are ground in the presence of water to form a pumpable kiln feed slurry, the improvement which comprises adding to said slurry an amount of a water-demand reducing system sufficient to synergistically reduce the water demand of said slurry, said system comprising (1) a water-soluble salt of a polyacrylic acid having a molecular weight of from about 2000 to about 50,000 and (2) a compound selected from the group consisting of alkali metal carbonates, bicarbonates, oxalates, silicates, aluminates and borates and ammonium carbonates, bicarbonates, oxalates and borates, (1) and (2) being employed in a ratio of from about 1:1 to about 1:80 by weight.

2. The process of claim 1 wherein the polyacrylic acid has a molecular weight of from about 2000 to about 20,000.

3. The process of claim 1 wherein the polyacrylic acid has a molecular weight of from about 5000 to about 10,000 and a viscosity of from about 75 to about 150 cps at 30 percent solids.

4. The process of claim 1 wherein the compound is selected from the group consisting of alkali metal carbonate, bicarbonate and silicate and ammonium carbonate and bicarbonate salts.

5. The process of claim 6 wherein the compound is an alkali metal or ammonium carbonate.

6. The process of claim 4 wherein the compound is an alkali metal silicate.

7. The process of claim 2 wherein the compound is selected from the group consisting of alkali metal carbonate, bicarbonate and silicate and ammonium carbonate and bicarbonate.

8. The process of claim 3 wherein the compound is selected from the group consisting of alkali metal carbonate, bicarbonate and silicate and ammonium carbonate and bicarbonate.

9. The process of claim 3 wherein the compound is an alkali metal or ammonium carbonate.

10. The process of claim 3 wherein the compound is an alkali metal silicate.

11. The process of claim 1 wherein the polyacrylic acid salt and compound are employed in ratios of from about 1:1 to about 1:10.

12. The process of claim 1 wherein the polyacrylic acid salt and compound are employed in ratios of from about 1:1 to about 1:6.

13. A pumpable kiln feed slurry useful in a wet process to produce portland cement, said slurry containing amounts of a water-demand reducing system sufficient to synergistically reduce the water demand of said slurry and comprising (1) a water-soluble salt of a polyacrylic acid having a molecular weight of from about 2,000 to about 50,000 and (2) a compound selected from the group consisting of alkali metal carbonates, bicarbonates, oxalates, silicates, aluminates and borates and ammonium carbonates, biarbonates, oxalates and borates, (1) and (2) being employed in a ratio of from about 1:1 to about 1:80 by weight.

14. The slurry of claim 13 wherein the polyacrylic acid has a molecular weight of from about 2000 to about 20,000.

15. The slurry of claim 13 wherein the polyacrylic acid has a molecular weight of from about 5000 to about 10,000 and a viscosity of from about 75 to about 150 cps at 30 percent solids.

16. The slurry of claim 13 wherein the compound is selected from the group consisting of alkali metal carbonate, bicarbonate and silicate and ammonium carbonate and bicarbonate.

17. The slurry of claim 13 wherein the compound is an alkali metal or ammonium carbonate.

18. The slurry of claim 13 wherein the compound is an alkali metal silicate.

19. The slurry of claim 14 wherein the compound is selected from the group consisting of alkali metal carbonate, bicarbonate and silicate and ammonium carbonate and bicarbonate.

20. The slurry of claim 15 wherein the compound is selected from the group consisting of alkali metal carbonate, bicarbonate and silicate and ammonium carbonate and bicarbonate salts.

21. The slurry of claim 15 wherein the compound is an alkali metal or ammonium carbonate.

22. The slurry of claim 15 wherein the inorganic compound is an alkali metal silicate.

23. The slurry as in claim 13 wherein the polyacrylic acid salt and compound are employed in ratios of from about 1:1 to about 1:10 by weight.

24. The slurry as in claim 13 wherein the polyacrylic acid salt and compound are employed in ratios of from about 1:1 to about 1:6.

25. The process of claim 1 wherein the polyacrylic acid salt is employed in concentrations of from about 0.005 to about 0.06 weight percent and said compound is employed in concentrations of about 0.05 to about 0.4 weight percent.

26. The process of claim 4 wherein the polyacrylic acid salt is employed in concentrations of from about 0.005 to about 0.06 weight percent and said compound is employed in concentrations of from about 0.05 to about 0.4 weight percent.

27. The process of claim 4 wherein the polyacrylic acid salt is employed in concentrations of from about 0.01 to about 0.05 weight percent and said compound is employed in concentrations of from about 0.05 to about 0.2.

28. The process of claim 8 wherein the polyacrylic acid salt and compound are employed in ratios of from about 1:1 to about 1:10.

29. The process of claim 28 wherein the polyacrylic acid salt is employed in concentrations of from about 0.005 to about 0.06 weight percent and said compound is employed in concentrations of from about 0.05 to about 0.4 weight percent.

30. The process of claim 28 wherein the polyacrylic acid salt is employed in concentrations of from about 0.01 to about 0.05 weight percent and said compound is employed in concentrations of from about 0.05 to about 0.2 weight percent.

31. The slurry as in claim 13 wherein the polyacrylic acid salt is employed in concentrations of from about 0.01 to about 0.05 weight percent and said compound is employed in concentrations of from about 0.05 to about 0.2 weight percent.

32. The slurry as in claim 19 wherein the polyacrylic acid salt and compound are employed in ratios of from about 1:1 to about 1:10.

33. The slurry as in claim 19 wherein the polyacrylic acid salt and compound are employed in ratios of from about 1:1 to about 1:6.

34. The slurry as in claim 32 wherein the polyacrylic acid is employed in concentrations of from about 0.005 to about 0.06 weight percent and said compound is employed in concentrations of from about 0.05 to about 0.4 weight percent.

35. The slurry as in claim 32 wherein the polyacrylic acid is employed in concentrations of from about 0.01 to about 0.05 weight percent and said compound is employed in concentrations of from about 0.05 to about 0.2 weight percent.

36. The process as in claim 20 wherein the polyacrylic acid salt and compound are employed in ratios of from about 1:1 to about 1:10.

37. The process of claim 36 wherein the polyacrylic acid salt is employed in concentrations of from about 0.005 to about 0.06 weight percent and said compound is employed in concentrations of from about 0.05 to about 0.4 weight percent.

38. The process as in claim 36 wherein the polyacrylic acid salt is employed in concentrations of from about 0.01 to about 0.05 weight percent and said compound is employed in concentrations of from about 0.05 to about 0.2 weight percent.

* * * * *

UNITED STATES PATENT AND TRADEMARK OFFICE
CERTIFICATE OF CORRECTION

PATENT NO. : 4,175,975

DATED : November 27, 1979

INVENTOR(S) : Dalton C. MacWilliams and James R. Wirt

It is certified that error appears in the above-identified patent and that said Letters Patent are hereby corrected as shown below:

Column 2, line 17, "temperature" should be plural;

Column 2, line 22, "requires" should be singular;

Column 2, line 37, "polyacrylic" is misspelled;

Column 3, line 27, delete "apparent" and insert -- prepared -- ;

Column 3, line 55, after the first "sodium" and before or insert -- sulfite -- ;

Column 5, line 30, "contents" should be singular;

Column 5, line 58, "concentrations" should be singular;

Column 6, line 60, delete "of";

Column 10, line 43, "bicarbonates" is misspelled;

UNITED STATES PATENT AND TRADEMARK OFFICE
CERTIFICATE OF CORRECTION

PATENT NO. : 4,175,975

DATED : November 27, 1979

INVENTOR(S) : Dalton C. MacWilliams and James R. Wirt

It is certified that error appears in the above-identified patent and that said Letters Patent are hereby corrected as shown below:

Column 10, line 68, delete "salts";

Column 11, line 3, delete "inorganic";

Signed and Sealed this

Twenty-second Day of April 1980

[SEAL]

Attest:

SIDNEY A. DIAMOND

Attesting Officer

Commissioner of Patents and Trademarks